No. 827,908. PATENTED AUG. 7, 1906.
H. B. EARECKSON.
NUT LOCK.
APPLICATION FILED NOV. 20, 1905.
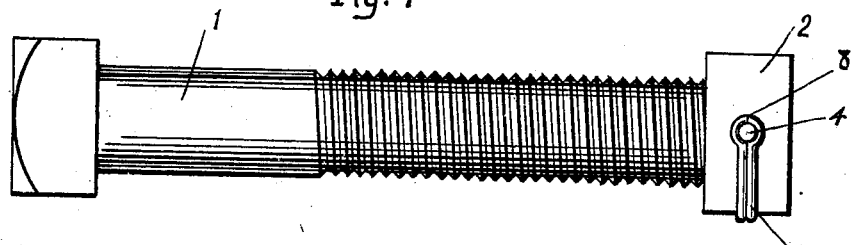
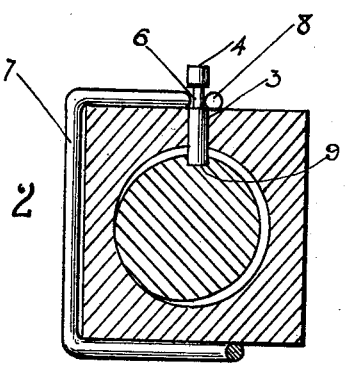
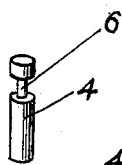 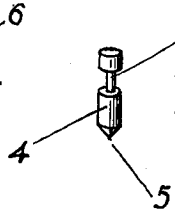
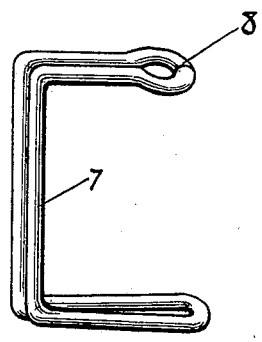
Witnesses
G. Holt
Inventor
H. B. Eareckson
By
F. M. Wright,
Attorney

UNITED STATES PATENT OFFICE.

HENRY B. EARECKSON, OF SAN FRANCISCO, CALIFORNIA.

NUT-LOCK.

No. 827,908.      Specification of Letters Patent.      Patented Aug. 7, 1906.

Application filed November 20, 1905. Serial No. 288,199.

*To all whom it may concern:*

Be it known that I, HENRY B. EARECKSON, a citizen of the United States, residing at San Francisco, in the county of San Francisco and State of California, have invented certain new and useful Improvements in Nut-Locks, of which the following is a specification.

This invention relates to improvements in nut-locks, the object of the invention being to provide a nut-lock which will be cheap and simple in construction, having few parts in addition to the bolt and nut and those few parts small and easily formed and which will be effective and simple in operation.

In the accompanying drawings, Figure 1 is a side elevation of a bolt and nut equipped with my improved nut-lock. Fig. 2 is a cross-section thereof through the center of the nut-lock. Fig. 3 is a side view of the locking-pin. Fig. 4 is a perspective view of the locking-spring. Fig. 5 is a side view of a modified form of pin.

Referring to the drawings, 1 represents a bolt, and 2 a nut thereon. Through one side of said nut is formed a radial hole 3 for a locking-pin 4, the bolt being also formed with a socket 9, adapted to register with the hole 3. The outer end of the pin 4 is formed with an annular groove 6.

7 is a locking-spring, formed of spring-wire, doubled and then bent into a U shape, the free ends of the spring being bent so that the extreme points thereof contact with each other and form a loop or eye 8.

In use when the nut has been screwed on the desired distance the pin is inserted in the hole 3 and socket 9. The U-shaped spring is then passed over the nut, as shown, and the free ends thereof are spread apart by inserting any suitable wedge-shaped instrument between the sides of the spring above the eye or loop. The sides of said loop are thus passed around the grooved portion 6 of the pin, and when they are in this position the sides of the spring are allowed to spring together, whereupon the grooved portion is firmly held within said eye. The pin itself is retained within the passage by the eye in the spring surrounding the grooved portion, while the spring is retained upon the nut by its engagement with the pin.

The form of nut-lock shown in Figs. 1 to 4 is best adapted for axle-nuts or in other cases where the nut is screwed on as far as a previously-ascertained point, at which point the socket 9 is formed in the bolt to register with the hole 3 in the nut.

In other cases the modification shown in Fig. 5 may be used, in which the pin is formed with a sharp point 5 and in which therefore no socket 9 is needed in the bolt, the pin being given a sharp blow to make an indentation in the bolt.

It will be seen that this nut-lock is very simple in construction. Also it requires no change in existing bolts and very little in the nut. The additional parts are cheap and simple in construction. Also it is easily applied.

I claim—

1. In combination with a bolt and a nut thereon, the latter having a radial hole, a pin in said hole, and a spring engaging two opposite parallel sides of the periphery of the nut, the spring and pin being provided with coengaging means for retaining the pin and spring in position, substantially as described.

2. In combination with a bolt and a nut, the latter having a radial hole, a pin therein having a grooved portion extending beyond the nut, a double U-shaped spring extending around the periphery of the nut, the free ends of the spring engaging the grooved portion of the pin to prevent withdrawal thereof, substantially as described.

3. The combination with a bolt and a nut, the latter having a radial hole, a pin therein having a grooved portion extending beyond the nut, a double U-shaped spring extending around the periphery of the nut, the free ends of the spring being formed into a loop or eye engaging the grooved portion of the pin to prevent withdrawal thereof, substantially as described.

4. In combination with a bolt and a nut thereon, the latter having a radial hole and the bolt having a socket which can register with said hole, a pin in said hole and socket, and a spring engaging two opposite parallel sides of the periphery of the nut, the spring and pin being provided with coengaging means for retaining the pin and spring in position, substantially as described.

In witness whereof I have hereunto set my hand in the presence of two subscribing witnesses.

H. B. EARECKSON.

Witnesses:
    BESSIE GORFINKEL,
    ANNIE PETERSON.